July 16, 1929.  C. D. JONES  1,720,841

THIN MATCHED MATERIAL AND METHOD OF MAKING THE SAME

Filed June 2, 1928

Inventor
Charles D. Jones
By J. Wm. Ellis
Attorney

Patented July 16, 1929.

1,720,841

UNITED STATES PATENT OFFICE.

CHARLES D. JONES, OF BUFFALO, NEW YORK.

THIN MATCHED MATERIAL AND METHOD OF MAKING THE SAME.

Application filed June 2, 1928. Serial No. 282,437.

As is well known to those skilled in the art, there is large demand for wooden material for certain types of crates and shipping containers, which is matched so as to provide closed joints between the adjacent pieces of material. Such material must necessarily be very thin for the sake of cheapness and lightness. It is known that matched lumber for flooring and siding has been made by first grooving a relatively thick piece of material, and afterwards sawing the material so as to form a number of pieces of lumber. However, it is impossible to make lumber, capable of being joined with tongue and groove, as thin as is necessary for light weight box shooks, but if it were possible to make such jointed lumber, it would be wholly unsuitable for this purpose, since while the tongue of one part might be strong enough, the walls flanking the groove of the coacting part would be too weak and so easily broken as to make the joint worthless. No attempt has, however, heretofore been made to make thin lumber suitable for crating, with a rabbet formed along each longitudinal edge arranged to fit projections on the adjacent pieces of lumber made by cutting rabbets on these pieces.

The principal object of my invention has been to provide rabbeted material of uniform thickness having a rabbet formed on each longitudinal edge and arranged diagonally opposite each other.

Another object has been to provide a method by means of which relatively thin joined material suitable for crating and the like may be made.

Moreover, my invention provides a method by which lumber of this nature may be cheaply made.

The above objects and advantages have been accomplished by the invention shown in the accompanying drawings which forms part of this application. In the drawings.

Figure 1:
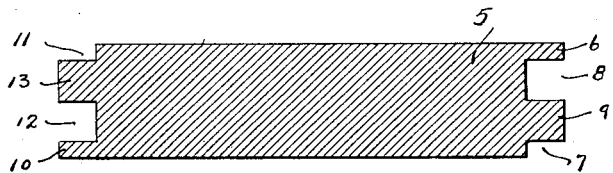
Fig. 1 shows a relatively thick piece of material illustrating the first step of my method.
Figure 2:
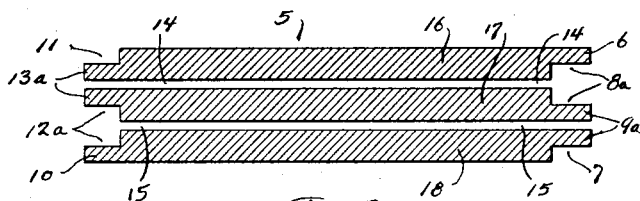
Fig. 2 is a similar view showing the material severed by means of saw cuts, and illustrates the second part of my method.

The essence of my invention lies in the solution it provides for the difficulty of rabbeting thin material, both in the handling of the material and in the locating of and support for the cutting tool action, which are avoided by making the rabbet-forming cuts in the unreduced material, and making the dividing cuts, which are also easier to make accurately, effect the thinning.

According to my invention each piece of material is formed along each of its longitudinal edges with a cut so that it may be joined by lapping with another piece of material so as to form a continuous board of any desired width, each joint being so lapped that it is effectively closed against loss of contents of, for instance, a container made from my material, and so that it is substantially weather-tight.

In carrying out my method, I first provide a piece of lumber 5 which I will refer to hereinafter as the stock. The width of this stock is substantially equal to the width of the desired finished product. The thickness of the stock is equal substantially to the thickness of the finished pieces of material to be made therefrom plus the width of the necessary number of saw cuts. In carrying out my method I preferably make the thickness of the stock 5 such that three complete pieces are formed, allowing, of course, for two saw cuts.

I form on one longitudinal edge surface of the stock 5 one complete projection 6 at one corner of the stock and one complete rabbet 7 at the opposite corner of the stock on the same edge surface. Between the projection and rabbet I form a double rabbet 8 lying adjacent the projection 6 and a double projection 9 lying adjacent the rabbet 7. On the opposite edge surface of the stock I form a complete projection 10 at one corner of the surface, a complete rabbet 11 on the opposite corner of the same surface, a double rabbet 12 adjacent the projection 10, and a double projection 13 adjacent the rabbet 11. The projections and rabbets formed on this edge surface of the stock are oppositely arranged with respect to the projections and rabbets on the opposite edge surface, the complete rabbet 11 being opposite the complete projection 6, while the projection 10, double rabbet 12 and double projection 13 are opposite, respectively, the rabbet 7, double projection 9 and double rabbet 8.

Figure 3:
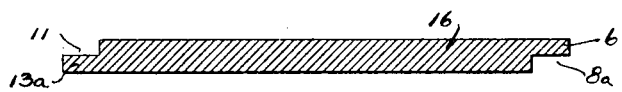
Fig. 3 shows a finished piece of material.
Figure 4:
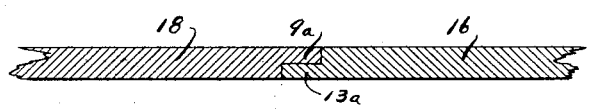
Fig. 4 shows two pieces of material joined together.

After the longitudinal edge surfaces of the stock are thus formed with the rabbets and projections just above described, the stock is run through a finishing machine. In this finishing machine interspaced saws are provided and one saw-cut 14 is made at the center of the double projection 13 and extends clear across the piece of stock to the oppositely arranged double rabbet 8, thus forming single projections 13ª and single rabbets 8ª. Another saw-cut 15 is made at the center of the double rabbet 12 and extends across to the double projection 9 at the opposite edge of the stock, thus forming single rabbets 12ª and single projections 9ª. The stock is thus cut into three complete, finished pieces of material 16, 17 and 18 each longitudinal edge of each having a projection and a rabbet for lapping engagement with adjacent pieces of material, as shown in Fig. 4. Since the projections and rabbets are oppositely arranged on the stock 5, each of the finished pieces will have an oppositely arranged projection and rabbet at its opposite longitudinal edges, as shown in Fig. 3 so that the finished pieces of material may be joined as shown in Fig. 4 and a very light crate or container of substantial strength and of any desired size be made, each of the joints being substantially sealed against loss of contents of the crate as well as being substantially weather-proof.

Obviously, some modifications of the details herein shown and described may be made without departing from the spirit of my invention or the scope of the appended claim, and I do not, therefore, wish to be limited to the exact embodiment herein shown and described, the form shown being merely a preferred embodiment thereof.

Having thus described my invention, what I claim is:

A process having the object of forming from relatively thick stock rabbeted pieces of material having uniform thickness and being so thin that individual rabbeting is difficult, consisting in providing a piece of stock having a thickness sufficient for forming a definite number of finished pieces, forming the opposite edges of the stock with contours of such size and shape that when the pieces are finished by sawing they will have edges which will intermatch with one another, and then sawing the stock in parallel cuts so as to form such finished matching pieces.

In testimony whereof, I have hereunto signed my name.

CHARLES D. JONES.